United States Patent
Rasmussen

(10) Patent No.: US 8,632,681 B2
(45) Date of Patent: Jan. 21, 2014

(54) FORWARD OSMOSIS DEVICE

(75) Inventor: Christian Rasmussen, Tjele (DK)

(73) Assignee: Grundfos Management A/S, Bjerringbro (DK)

( * ) Notice: Subject to any disclaimer, the term of this patent is extended or adjusted under 35 U.S.C. 154(b) by 458 days.

(21) Appl. No.: 13/059,764

(22) PCT Filed: Aug. 21, 2009

(86) PCT No.: PCT/DK2009/050208
§ 371 (c)(1),
(2), (4) Date: Mar. 30, 2011

(87) PCT Pub. No.: WO2010/020253
PCT Pub. Date: Feb. 25, 2010

(65) Prior Publication Data
US 2011/0174736 A1    Jul. 21, 2011

(30) Foreign Application Priority Data
Aug. 21, 2008   (DK) ................................ 2008 01143

(51) Int. Cl.
*B01D 63/00* (2006.01)
*C02F 1/44* (2006.01)

(52) U.S. Cl.
USPC ............ 210/321.63; 210/321.72; 210/321.76; 210/652

(58) Field of Classification Search
USPC ................... 210/321.63, 321.72, 321.76, 652
See application file for complete search history.

(56) References Cited

U.S. PATENT DOCUMENTS

2004/0109798 A1   6/2004   Chopard et al.

FOREIGN PATENT DOCUMENTS

WO    WO 99/39799 A1    8/1999

OTHER PUBLICATIONS

Cath, Tzahi Y. et al., "Forward osmosis: Principles, applications, and recent developments" Journal of Membrane Science, 2006, pp. 70-87, vol. 281.
Tan, Chien Hsiang et al., "Modified models to predict flux behavior in forward osmosis in consideration of external and internal concentration polarizations" Journal of Membrane Science, 2008, pp. 209-219, vol. 324.
Warczok, J. et al., "Reconcentration of spent solutions from osmotic dehydration using direct osmosis in two configurations" Journal of Food Engineering, 2007, pp. 317-326, vol. 80.

*Primary Examiner* — Dirk Bass
(74) *Attorney, Agent, or Firm* — Knobbe Martens Olson & Bear LLP

(57) ABSTRACT

The invention relates to a forward osmosis (FO) device (10) with a semipermeable membrane (5, 5a) capable of performing forward osmosis between a first (F1) and a second fluid (F2). In a first fluid confinement (4a), a first swirl generator (7a) is positioned and in a second fluid confinement (4b) positioned on the other second side of the membrane, a second swirl generator (7b) is positioned. The swirl generators are arranged to create a circular flow pattern (S2, S3) for the first and the second fluid, respectively, wherein the first (7a) and second (7b) swirl generator, upon engagement, are arranged to create a circular flow pattern for the first and the second fluid, respectively, by rotating motion (RA1, RA2). The invention is advantageous by obtaining FO device that is capable of reducing the concentration polarization (CP) near the membrane by creating a cross flow velocity over the membrane and facilitate control of the cross flow velocity independent of the through flow of the membrane. The external concentration polarization can thereby be controlled and further reduced.

15 Claims, 17 Drawing Sheets

A-A:

FORWARD OSMOSIS DEVICE

CROSS REFERENCE TO RELATED APPLICATIONS

This application claims the benefit and priority to and is a U.S. National Phase Application of PCT International Application Number PCT/DK2009/050208, filed on Aug. 21, 2009, designating the United States of America and published in the English language, which is an International Application of and claims the benefit of priority to Danish Patent Application No. PA 2008 01143, filed on Aug. 21, 2008. The disclosures of the above-referenced applications are hereby expressly incorporated by reference in their entireties.

FIELD OF THE INVENTION

The present invention relates to a forward osmosis (FO) device. The invention also relate to a fluid management system comprising a forward osmosis device, a corresponding method for operating a forward osmosis (FO) device, and a corresponding computer program product for implementing the invention. Osmosis has widespread applications in nature and technology. Osmosis is a process that conventionally is defined as a net movement of water across a selectively permeable membrane driven by a difference in osmotic pressure across the said membrane. Equivalently, the transport of water can be explained as a process driven by a difference in the chemical potential of water, $\mu$, from the high potential region to the lower potential region. The membrane thereby allows passage of water but rejects or repels solute molecules and ions.

BACKGROUND OF THE INVENTION

For water treatment reverse osmosis (RO) is typically used. In RO, an applied pressure exceeds the osmotic pressure of an aqueous feed solution to produce substantially clean water, e.g. desalinated water. Forward osmosis (FO) differs from reverse osmosis (RO) in that no or little hydraulic pressure is applied. This has the advantage that little energy is needed for the process to take place. Potentially, forward osmosis is thus superior to reverse osmosis with respect to energy consumption, but the FO technology is not yet fully developed for various applications.

Osmosis can in generally be classified through the equation:

$$J_w = A(\sigma \Delta \pi - \Delta P)$$

where $J_w$ is the water flux or membrane flux, A the water permeability constant of the membrane, $\sigma$ the reflection coefficient, $\Delta \pi$ the osmotic pressure differential across the membrane, and $\Delta P$ the applied pressure. Three regimes may be identified for a given membrane: $\Delta P=0$; this is Forward osmosis. $\Delta P > \Delta \pi$; this is reverse osmosis, and, finally, $\Delta P < \Delta \pi$; which is so-called pressure-retarded osmosis (PRO). PRO is currently an experimental technique for power generation. For a recent review of forward osmosis, the skilled reader is referred to Cath et al., Forward Osmosis: Principles, applications, and recent developments, Journal of Membrane Science, 281 (2006) 70-87.

In osmotic processes, both RO and FO, the effective osmotic pressure difference is significantly lower than what would be expected from the bulk osmotic pressure difference. This reduces in turn the water flux through the membrane and therefore the yield of the process. This reduction is attributed to transport phenomena related to the membrane, particularly concentration polarization (CP). CP arises due to the local concentration build-up next to which is unfortunately rather slowly removed by diffusion, and the resulting boundary layer results in a much lower effective osmotic pressure difference. This is known as external CP. The boundary layer within the membrane is known as the internal concentration polarization (CP), and it can be reduced by optimised membrane design, whereas the external concentration polarisation can be reduced by cross-flow and turbulence at the membrane surface. Turbulence promoters are known to decrease the external boundary layers, but they suffer from increased energy consumption and pressure drops due to the friction from the promoters. It is also difficult to clean an osmosis system if many turbulence promoters, e.g. spacers and spiral wound channels, are present.

Hence, an improved forward osmosis device would be advantageous, and in particular a more efficient and/or reliable device would be advantageous.

SUMMARY OF THE INVENTION

Thus, the above described object and several other objects are intended to be obtained in a first aspect of the invention by providing a forward osmosis (FO) device, the device comprising:

a semi-permeable membrane capable of performing forward osmosis between a first and a second fluid, a first fluid confinement positioned on a first side of the membrane, the first fluid confinement comprising a first swirl generator through which the first liquid is conveyable to the first fluid confinement, and a second fluid confinement positioned on a second side of the membrane, the second side being opposite to the membrane relative to the said first side, the second fluid confinement comprising a second swirl generator through which the second liquid is conveyable to the second fluid confinement, wherein the first and second swirl generator, upon engagement, are arranged to create a circular flow pattern for the first and the second fluid, respectively.

The invention is particularly, but not exclusively, advantageous for obtaining forward osmosis device that is capable of substantially reducing the concentration polarisation near the semi-permeable membrane by creating a cross flow velocity over the membrane, which is typically perpendicular to the through flow velocity, and which gives control of the cross flow velocity independent of the through flow of the membrane. The external concentration polarization can thereby be controlled and further reduced.

In the present context, the term "circular flow pattern" is preferably used to denote a rotating flow pattern comprising a tangential as well as a radial velocity vector component. Accordingly, fluid elements situated substantially in a circle around the centre of a swirl generator may preferably have the same magnitude of the tangential and radial velocity vector component, i.e. rotational symmetry. Substantially in that context is preferably used to reflect that there may be an area within and close to e.g. an impeller where the flow pattern will be influenced e.g. by boundary layer conditions along the impeller blades. These effects are however mainly present within and closely around the impeller, whereas away from the impeller the fluid flow may be more homogeneous. Any person skilled in the art of impellers is familiar with the type of flow pattern generated by an impeller, in the present context this type of pattern is referred to as a "circular flow pattern", since it is generated by the circular movement of the impeller.

The present invention further provides control of the cross flow in manner which may be independent of the inlet and outlet flows of the membrane confinement.

In a typical forward osmosis system there is a pressure gradient from a high pressure at the inlet to a lower pressure at the outlet in order to provide a cross flow over the membrane. The present invention makes it possible to have a low variation of pressure in the membrane confinement where the fluids flow past the membrane. This allows for membranes with lower mechanical strength and thereby thinner membranes. In turn this reduces the internal concentration polarization which is normally an increasing function of the membrane thickness.

Accordingly, the present invention primarily provides dynamic control of the external concentration polarization, and secondarily gives design possibilities for lowering the internal concentration polarization within the FO membrane.

Beneficially, the first and second swirl generator may, upon engagement, be arranged to create a circular flow pattern for the first and the second fluid, respectively, by rotating motion. Preferably, the first and second swirl generator may each have an axis of rotation which is substantially perpendicular to a surface of the semi-permeable membrane. By the term surface it is understood that surface may refer to the local surface i.e. a surface in proximity of the swirl generator. If for example the semi-permeable membrane has a curvature this may be a relevant consideration. Advantageously, the rotational speed of the first and the second swirl generator may be independently controllable, thus, each generator may be rotated by separate actuators. Alternatively, the rotational speed of the first swirl generator may be mechanically connected to the rotational speed of the second swirl generator. Thus, the first and second swirl generator may be driven by the same actuator, and may for example share a driving axel.

In one embodiment, the forward osmosis device may comprise:

a further semi-permeable membrane capable of performing forward osmosis between a third and a fourth fluid, a third fluid confinement positioned on a first side of the further membrane, the third fluid confinement comprising a third swirl generator through which the third liquid is conveyable to the third fluid confinement, and a fourth fluid confinement positioned on a second side of the further membrane, the second side being opposite to the further membrane relative to the said first side, the fourth fluid confinement comprising a fourth swirl generator through which the fourth liquid is conveyable to the fourth fluid confinement, wherein the third and fourth swirl generator, upon engagement, are arranged to create a circular flow pattern for the third and the fourth fluid, respectively. In combination thereto, the third and forth swirl generator, upon engagement, may preferably be arranged to create a circular flow pattern for the third and the forth fluid, respectively, by rotating motion. In that way, the present invention may implemented in multi-configuration with a plurality of fluids and corresponding membranes and swirl generators. This may in particular for up-scaling provide a flexible advantage.

Furthermore, the fluid may be conveyable between the first and the third fluid confinement, and/or wherein fluid may be conveyable between the second and the fourth fluid confinement. Thus, the same fluid may be processed in more than one confinement. Likewise, the present invention may be combined in a communicating vessels or confinement configuration. Additionally, the rotational speed of the first swirl generator may be mechanically connected to the rotational speed of the third swirl generator, and/or the rotational speed of the second swirl generator may be mechanically connected to the rotational speed of the fourth swirl generator. This may be implemented e.g. by through-going axes which may simplify mechanical design. It should be noted a swirl generator may also induce a swirl in a neighboring confinement if fluid communication is possible.

In the context of the present invention it is to be understood that a swirl generator may comprises one or more impellers. Thus, there may be two impellers on the same side of a semi-permeable membrane which are considered to be one swirl generator. This is also consistent with the principle of superposition in fluid dynamics. Preferably, a swirl generator may comprise a plurality of impellers, the impellers being arranged in a substantially symmetric array with respect to the membrane, in particular to the centre of the membrane, e.g. the centre of mass for the membrane.

For the FO device one or more of the membranes may be substantially planar. Alternatively, a curved configuration may be applied, even circular configurations may be implemented.

In accordance with preferred embodiments of the present invention, a forward osmosis device may have a casing which preferably may be considered as a container like structure inside which one or more semi-permeable membranes and one or more swirl generator are arranged in accordance with the general principles of the invention. Thereby the need for connecting stand-alone units by pipes to provide a forward osmosis device may be avoided and a compact unit providing a good possibility to meet a given osmosis demand may be provided.

In a second aspect, the present invention relates to a method for operating a forward osmosis device according to the first aspect, wherein the forward osmosis device, at least for some operational parameters, for any of the first, the second, third and/or the fourth fluids has a cross flow velocity over the corresponding membrane which is substantially independent of the corresponding fluid velocity through the corresponding swirl generator.

For the method for operating a forward osmosis device a swirl generator may have a design swirl number Sv/w with the ratio of maximum (or average) tangential velocity, Vt_O, to a maximum (or average) radial velocity, Vr_O, as given by the formula:

$$Sv/w = Vt\_O/Vr\_O,$$

and the method may comprise operating the forward osmosis device with a design swirl number Sv/w of at least 1, 2, 3, 4, 5, 6, 7, 8, 9, 10, or 15. Preferably, wherein the design swirl number Sv/w may be controllable by a rotational speed of the swirl generator and/or by the flow rate of fluid flowing through the said swirl generator. Furthermore and advantageously, the rotational speed of the first, the second, the third and/or the fourth swirl generator may be controllable in response to a given demand for membrane flux from the FO device.

In a third aspect, the present invention relates to a fluid management system comprising a forward osmosis device according to the first aspect. Such a fluid management system may be implemented in domestic appliances, industrial appliances, agricultural appliances, etc. In particular, the fluid management system may be a waste water system or a desalination system, The fluid management system may also be implemented in combination with a reverse osmosis (RO) system.

In a fourth aspect, the present invention relates to a computer program product being adapted to enable a computer system comprising at least one computer having data storage means in connection therewith to control a forward osmosis device according to the second aspect.

This aspect of the invention is particularly, but not exclusively, advantageous in that the present invention may be accomplished by a computer program product enabling a computer system to carry out the operations of the apparatus/system of the second aspect of the invention when down- or uploaded into the computer system. Such a computer program product may be provided on any kind of computer readable medium, or through a network.

The first, second, third, and fourth aspect of the present invention may each be combined with any of the other aspects. These and other aspects of the invention will be apparent from and elucidated with reference to the embodiments described hereinafter.

BRIEF DESCRIPTION OF THE FIGURES

The forward osmosis device according to the invention will now be described in more detail with regard to the accompanying figures. The figures show one way of implementing the present invention and is not to be construed as being limiting to other possible embodiments falling within the scope of the attached claim set.

DETAILED DESCRIPTION OF AN EMBODIMENT

Figure 1:
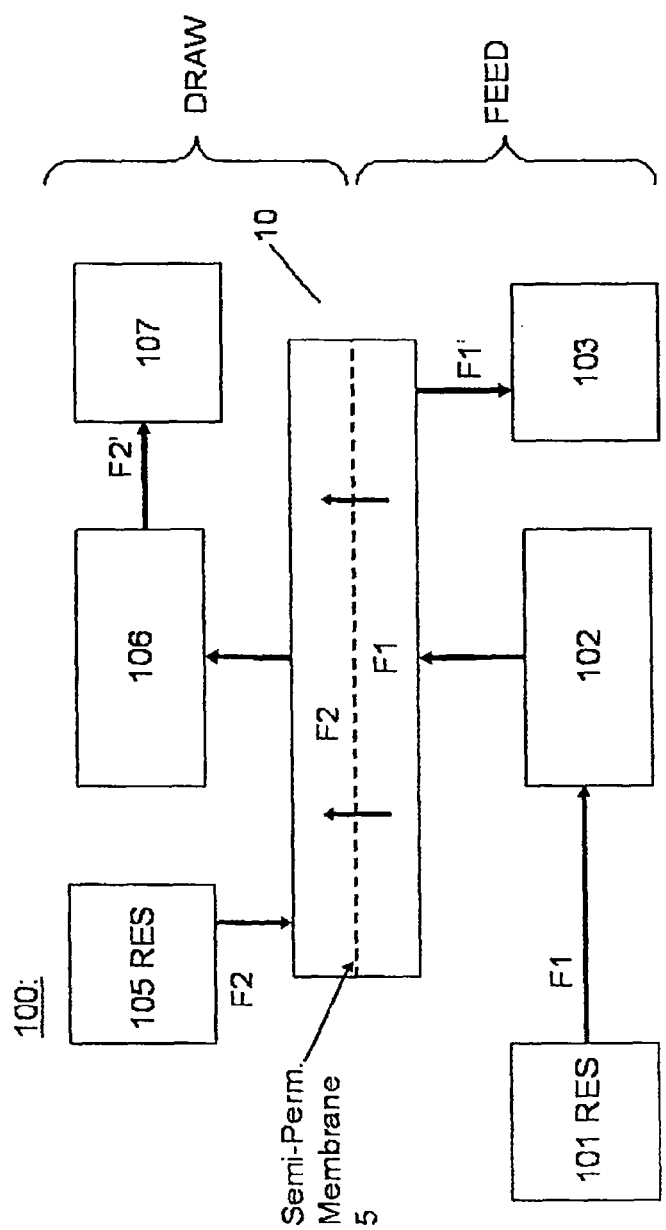
FIG. 1 is a schematic drawing of a fluid management system comprising a forward osmosis device according to the present invention.

FIG. 1 is a schematic drawing of a fluid management system 100 comprising a forward osmosis device 10 according to the present invention. From a fluid reservoir 101 RES the fluid F1 is conveyed to supply means 102, e.g. a pump or pumping station. From the supply 102, fluid F1 is convey through suitable conduction means, e.g. pipes and tubes, to the FO device 10. Details about the FO device 10 is further explained in connection with FIG. 3 and onwards, but generally a forward osmosis (FO) process takes place in the device 10, where solvent flows through the semi-permeable membrane 5 as indicated by the two arrows across the membrane 5. The membrane 5 is symbolically indicated with a dashed line across device 10. This flow results in an increased concentration of solutes in the fluid F1, and the resulting fluid F1' is conducted away from the device 10 to the end reservoir 103 for storage and/or further processing. The process side of the membrane 5 in a FO system is known as the "feed" side.

On the other side of the membrane 5, the process side is known as the "draw" side due to the fact that solvent is transported across the membrane 5 due to the difference in osmotic pressure, or equivalently due to a difference in the chemical potential of the solvent across the membrane 5. The fluid F2 on the draw side is known as the "draw solution", but similar expressions like osmotic agent, osmotic media, driving solution, osmotic engine, sample solution or just brine, are also known in the literature. The main property of the draw solution i.e. fluid F2 is that it should provide a higher osmotic pressure than the feed solution F1. On the draw side of the fluid management system 100, a reservoir 105 supplies the forward osmosis device 10 with fluid F2 that has a higher osmotic pressure than fluid F1 on the other side of the membrane 5 in order to have forward osmosis taking place. After dilution with solvent, the resulting fluid F2' is conveyed out of the forward osmosis device 10 by conveying means 106, e.g. by dedicated pumps and tubes/pipes (not shown), and transported further on to end reservoir 107 for storage and/or further processing.

Figure 2:
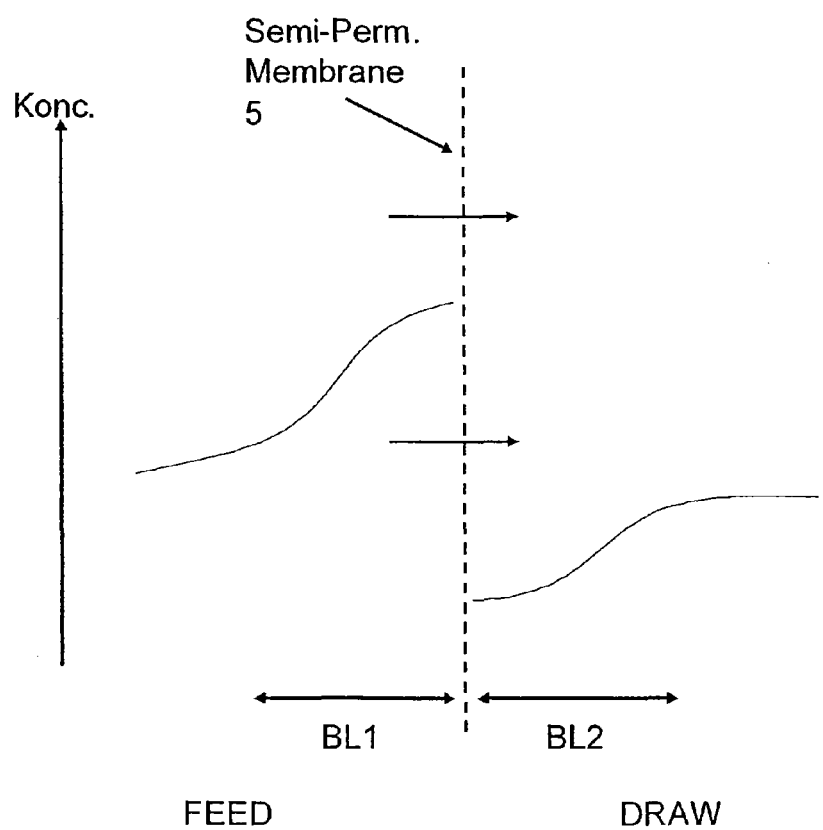
FIG. 2 is a schematic graph of the concentration profiles across a forward osmosis membrane.

FIG. 2 is a schematic graph of the concentration profiles of a solute on both sides of the forward osmosis membrane 5.

On the feed side, the solvent transport across membrane 5 results in a locally and possibly temporarily higher concentration of the solute. This build-up of solute concentration is known as an external concentration polarization (CP) with a boundary layer BL1. The boundary layer BL1 is typically microscopic in extension (e.g. 100 micrometer) but it can nevertheless significantly hamper the membrane flux. As it will be understood, the present invention can effectively reduce the boundary layer BL1 in an advantageous manner.

On the draw side, the solvent transport across membrane 5 results in a locally, and possibly temporarily, lower concentration of the solute i.e. a dilution. This decrease of solute concentration is known as an external concentration polarization (CP) with a small boundary layer BL2. The boundary layer BL2 is also typically microscopic in extension (e.g. 100 micrometer) but it can significantly hamper the membrane flux. As it will be understood, the present invention can effectively reduce the boundary layer BL2 in an advantageous manner.

Figure 3:
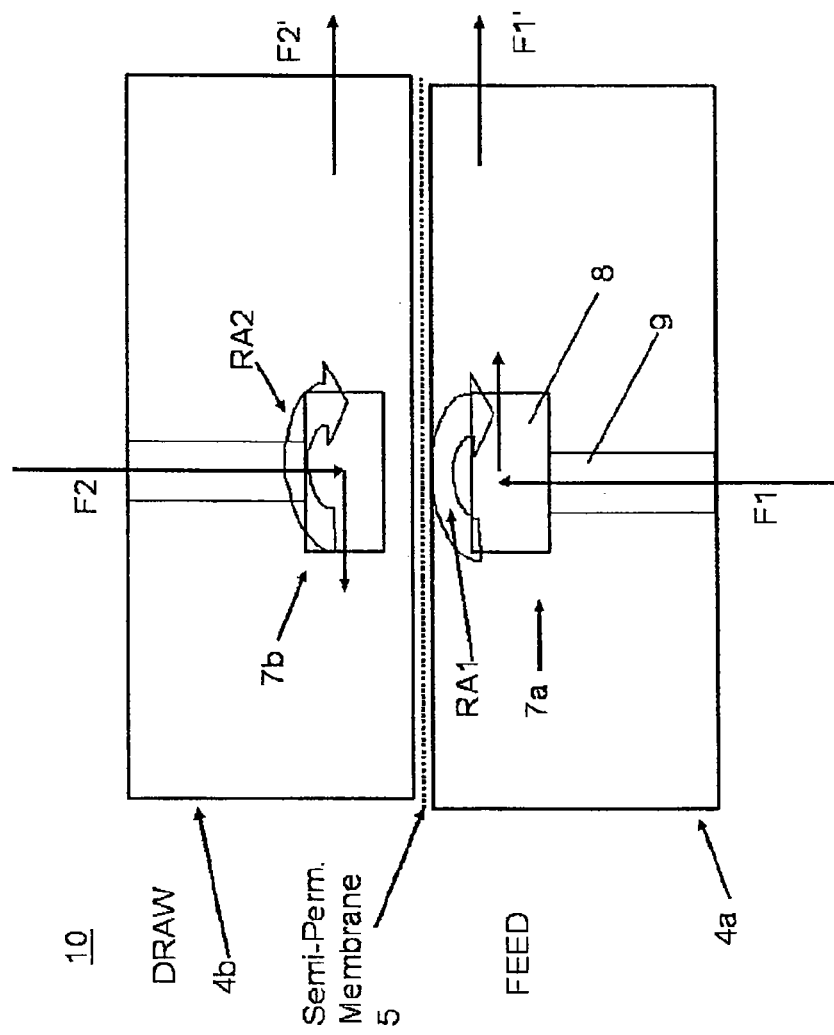
FIG. 3 is a schematic cross-sectional drawing of a forward osmosis device according to the present invention.

FIG. 3 is a schematic cross-sectional drawing of a forward osmosis device 10 according to the present invention. The device 10 has a semi-permeable membrane 5 capable of performing forward osmosis between a first F1 and a second fluid F2.

A first fluid confinement 4a is positioned on a first side of the membrane 5 (i.e. lower side in the Figure), the first fluid 4a confinement comprises a first swirl generator 7a through which the first liquid F1 is conveyable to the first fluid confinement 4a.

Similarly, a second fluid confinement 4b is positioned on a second side of the membrane 5, the second side being opposite to the membrane 5 relative to the said first side (i.e. on the upper side in the Figure), the second fluid confinement 4b comprises a second swirl generator 7b through which the second liquid F2 is conveyable to the second fluid confinement 4b.

Finally, the first 7a and the second 7b swirl generators are, upon engagement, arranged to create a circular flow pattern for the first and the second fluid, respectively. Preferably, the first and second swirl generator are arranged to create a circular flow pattern for the first and the second fluid, respectively, by rotating motion, as also indicated by arrows RA1 and RA2, respectively.

The swirl generator 7a or 7b is typically connected to fluid supply with a pump and the fluid F1 or F2 is conveyed to an end position of the generator 7a or 7b, where the first 7a and the second 7b swirl generators are capable of creating a substantially circular flow pattern for the first F1 and the second F2 fluid above the membrane. The generators 7a and 7b may as a special case be stationary both typically the generators will perform rotating motions to create the circular flow pattern. This can be implemented by for instance an impeller 8, which is mounted rotatable on the end portion of the fluid inlet 9 of the swirl generator.

Figure 4:
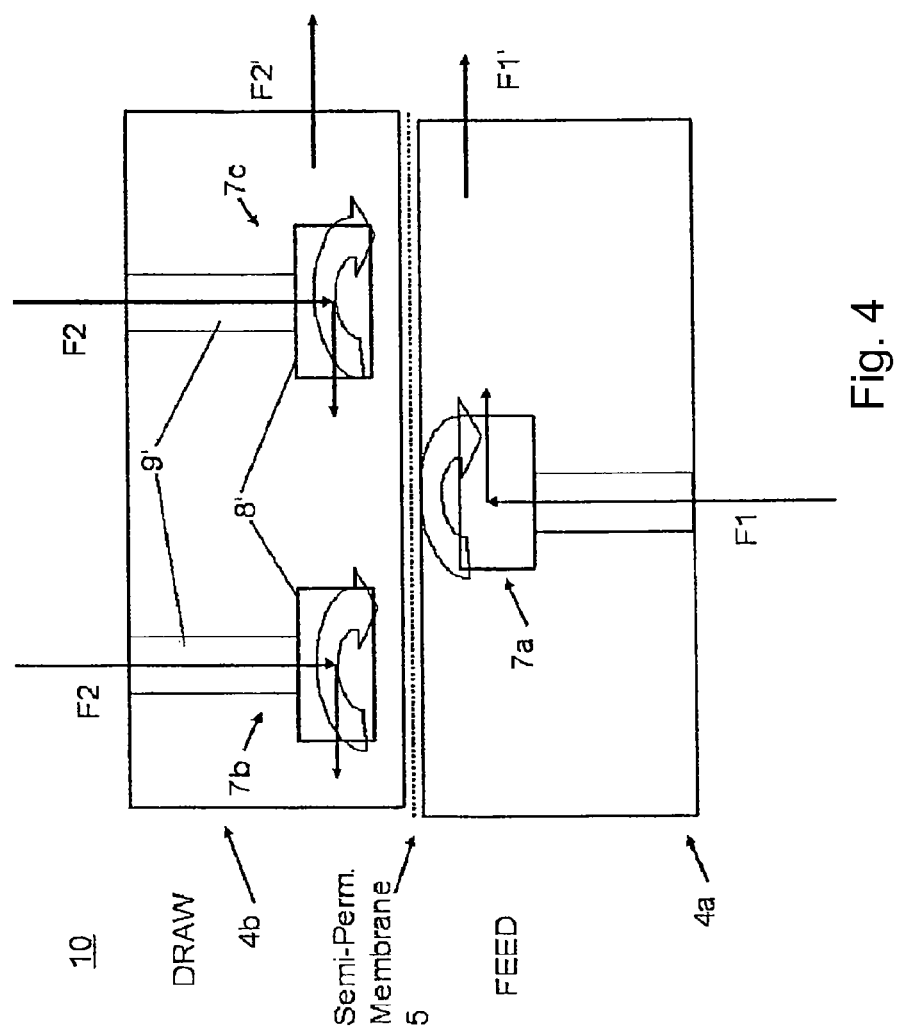
FIGS. 4 and 5 show other embodiments of a forward osmosis device according to the present invention.
Figure 5:
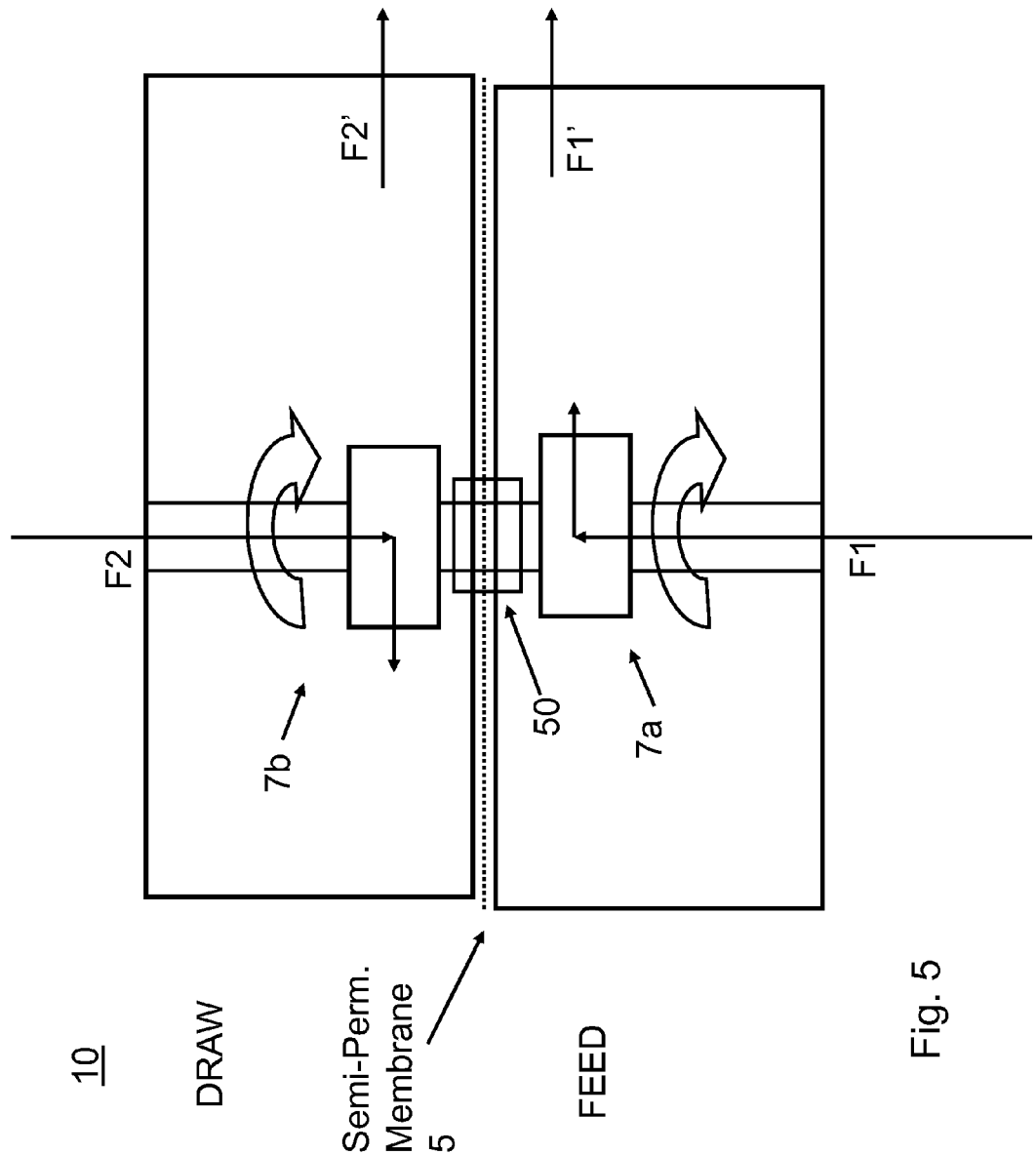

FIGS. 4 and 5 show other embodiments of a forward osmosis device 10 similar to the device depicted in FIG. 3.

FIG. 4 shows a FO device 10 according to the present invention where the swirl generator on the draw side (i.e. the upper side in the Figure) comprises two fluid inlets 9' for the fluid F2, each inlet has an end mounted rotatable impeller 8'. Thus, a swirl generator 7 may comprise one or more impellers 8 or 8'.

FIG. 5 shows a FO device 10 according to the present invention where the swirl generator 7a and 7b on the draw side and the feed side, respectively, are mechanically interconnected i.e. the rotational speed of the first swirl generator 7a is mechanically connected to the rotational speed of the second swirl generator 7b. This can be implemented in a straight-forward by a common rotational axis. In particular, the technical challenge of having a through going axis penetrating the semi-permeable membrane 5 has to be considered. A dedicated sealing 50 is provided that has no or insignificant leaking across the membrane 50 i.e. a shaft sealing. It should be remembered that leaking through the sealing 50 can be compared with the imperfect retention of the membrane 5.

Figure 6:
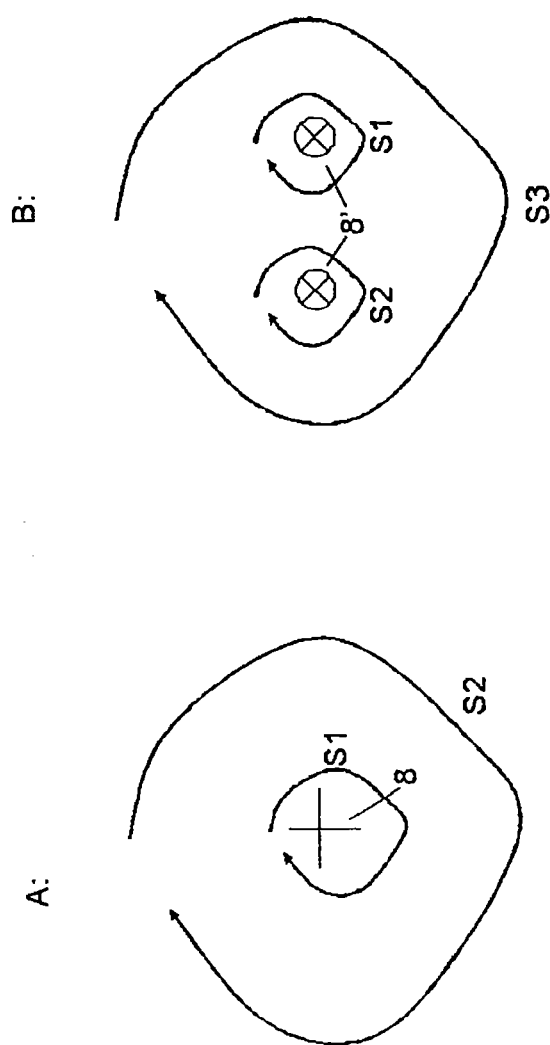
FIG. 6 is a simplified top-view of one and two impellers in a swirl generator in a forward osmosis device according to the present invention.

FIG. 6 is a simplified top-view of one (part A) and two impellers (part B), respectively, in a swirl generator of a forward osmosis device 10 according to the present invention.

In part A, a swirl generator with a single impeller 8 rotates and the impeller is locally creating a swirl pattern S1, which creates a total circular flow pattern S2. The situation is similar to the devices 10 of FIGS. 3 and 5, and for FIG. 4 on the feed side of the membrane 5 (lower side).

Figure 7:
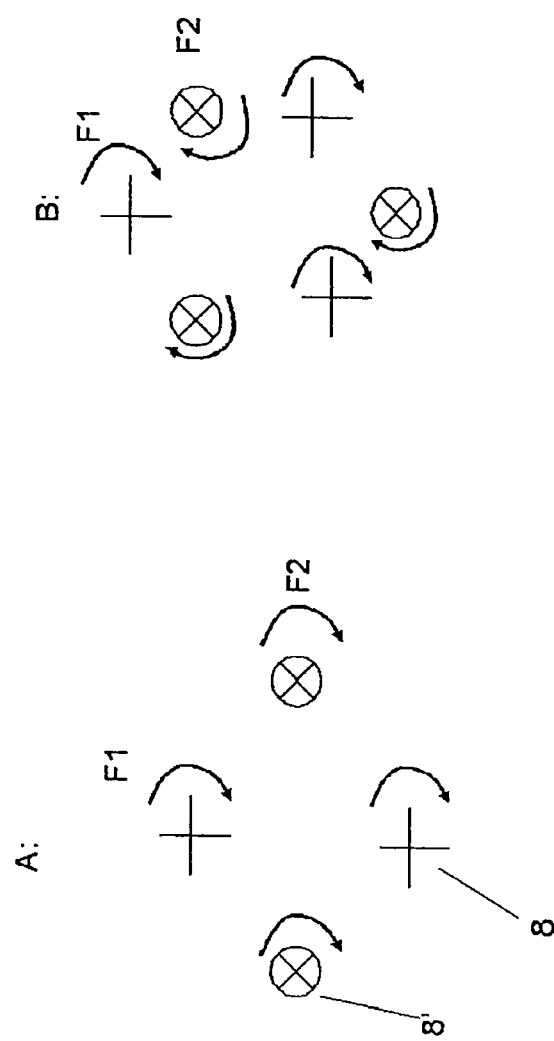
FIG. 7 is a simplified top-view of several possible positions for the swirl generators in two layers in a forward osmosis device according to the present invention.

In part B, a swirl generator with two impeller 8' rotates and the impeller are locally creating a swirl patterns S1 and S2, which creates a total circular flow pattern S3. This will be familiar to the skilled reader as the principle of superposition, see for example "Introduction to Fluid Mechanics" by Fox et al., John Wiley & Sons, Hoboken, N.J., USA, 2006. FIG. 7 is a simplified top-view of several possible positions for the impellers 8 and 8' of the swirl generators 7 in two overlaid layers in a forward osmosis device according to the present invention.

In part A, the two pairs of impellers 8 (indicated with an open cross) and 8' (indicated with a cross within a circle) are positioned in a square-like pattern where each pair 8 or 8' are positioned in opposing corners of the square-like pattern. On each side of the membrane (not shown) the impellers 8 and 8' can generate a resulting swirl pattern similar to the pattern shown in FIG. 6, part B. By arrows it is indicate how the impellers 8 and 8' all rotates clockwise, but they could of course also be rotating counter-clockwise or each pair of impellers 8 or 8' could have opposite direction of rotation.

Part B is similar to part A, but in part B three impellers are positioned on each side of the membrane (not shown). The direction of rotation is seen to be opposite on the different sides of the membrane. The resulting swirl pattern can be found by superposition of the three swirl patterns from the impellers.

Figure 8:
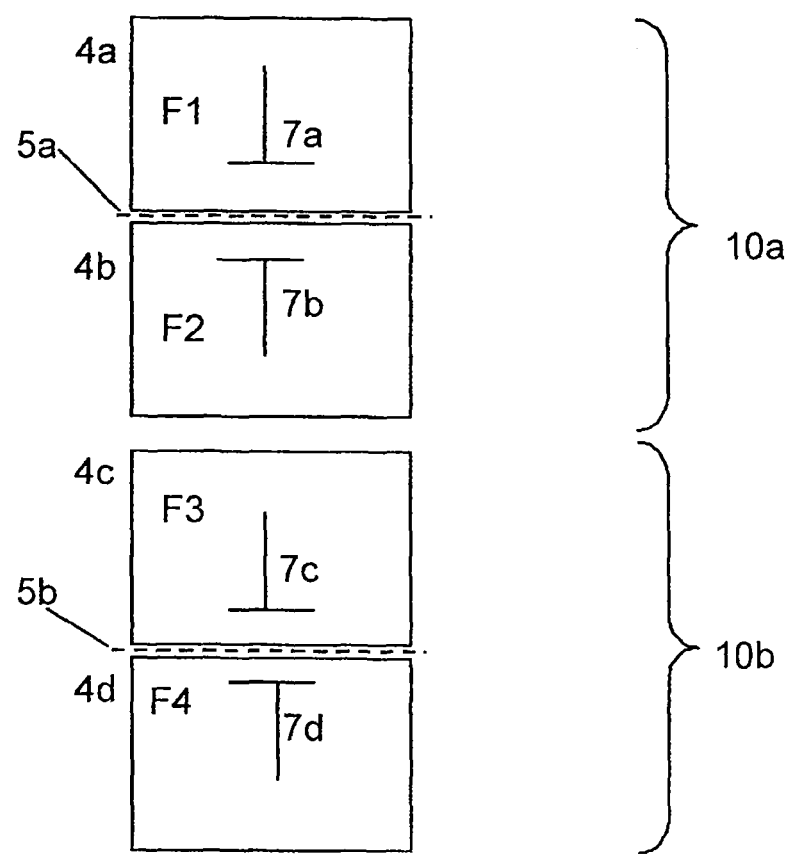
FIG. 8 is a schematic cross-sectional drawing of a forward osmosis device in a multi-level configuration according to the present invention.

FIG. 8 is a schematic cross-sectional drawing of a forward osmosis device 10 in a multi-level configuration according to the present invention. Like in FIG. 3 a semi-permeable membrane 5a is provided for FO between fluids F1 and F2 in the two confinements 4a and 4b, respectively. A further semi-permeable membrane 5b is capable of performing forward osmosis between a third F3 and a fourth fluid F4.

A third fluid confinement 4c is positioned on a first side of the further membrane 5b, the third fluid confinement 4c comprises a third swirl generator 7c through which the third liquid F3 is conveyed to the third fluid confinement. In FIGS. 8-12, the swirl generators 7 are generally by the symbol T or inverted T, but the details may equal or similar to the swirl generators 7a, 7b, and/or 7c shown in FIGS. 4-5. Specifically, one swirl generator may comprise one or more impellers; cf. FIG. 4, upper part.

A fourth fluid confinement 4d is positioned on a second side of the further membrane 5b, the second side being opposite to the further membrane relative to the said first side. The fourth fluid confinement 4d comprises a fourth swirl generator 7d through which the fourth liquid F4 is conveyed to the fourth fluid confinement. The inlets and outlets of the fluid F4, and similarly for the other three fluids F1, F2, and F3, are not shown or indicated for reason of simplicity in the FIGS. 8-12.

In accordance with the principles of the present invention, the third 7c and fourth 7d swirl generator can create a circular flow pattern for the third F3 and the fourth fluid F4, respectively, and thereby decrease the external concentration polarisation (CP), and possibly allow for thinner membranes 5a and 5b that may reduce internal concentration polarization (CP), preferably already during the design phase.

The invention can relate to a number of forward osmosis sub-devices that are stacked with a distance between each forward osmosis sub-devices so as to provide channels between two neighbouring sub-device. Thus, FIG. 8 comprises two FO sub-devices: an upper FO sub-device 10a with confinement 4a and 4b separated by membrane 5a, and a lower FO sub-device 10b with confinement 4c and 4d separated by membrane 5b.

The sub-device 10a can have channels being at least a part of the flow passages for the first F1 and the second F2 fluid, each sub-device 10a may have is at its rim preferably sealed to a casing and the sub-device comprising a number of connection stubs allowing fluids to flow from one channel to a channel located upstream of a neighbouring channel. The casing may constitute a casing, which preferably may be considered as a container like structure inside which one or more semi-permeable membranes and one or more swirl generator are arranged in accordance with the general principles of the invention.

While the forward osmosis device 10 is shown for four different fluids F1-F4 in FIG. 8, it should be mentioned that the principles of the invention can readily be extended to any plurality of fluids to be processed by forward osmosis (FO).

FIGS. 9-13 show other multi-level embodiments of a forward osmosis device according to the present invention.

Figure 9:
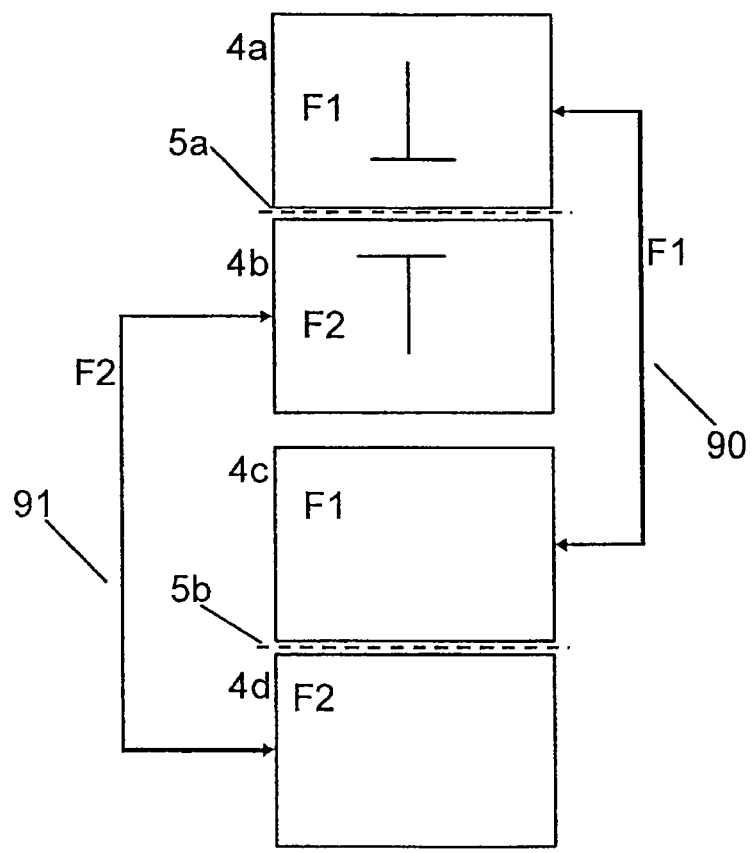
FIGS. 9-13 show other multi-level embodiments of a forward osmosis device according to the present invention.

FIG. 9 is similar to FIG. 8, but swirl generators are not present in confinement 4c and 4d, only in confinement 4a and 4b. Between the two lower confinements 4c and 4d, there is still performed forward osmosis across the membrane 5b. The fluid confinement 4a is in fluid contact with fluid confinement 4c during fluid connections means 90, e.g. a tube or pipe of a suitable size and length, so that the necessary cross flow is created and maintained also in confinement 4c in order for FO to take place in a satisfactory manner. Thus, confinement 4a and 4c may effectively be considered to be one and the same confinement. Similarly, confinement 4b and 4d are in fluid contact via fluid conduction means 91, and effectively confinement 4b and 4d can be considered to be one and the same confinement. Accordingly, the necessary swirl pattern in the cross flow of fluids F1 and F2 over the membranes 5a and 5b can be implemented in a multi-level configuration where the swirl generators 7a and 7b can be remotely positioned from the resulting swirl patterns, and swirls pattern can be generated through fluid connection means 90 and 91.

Figure 10:
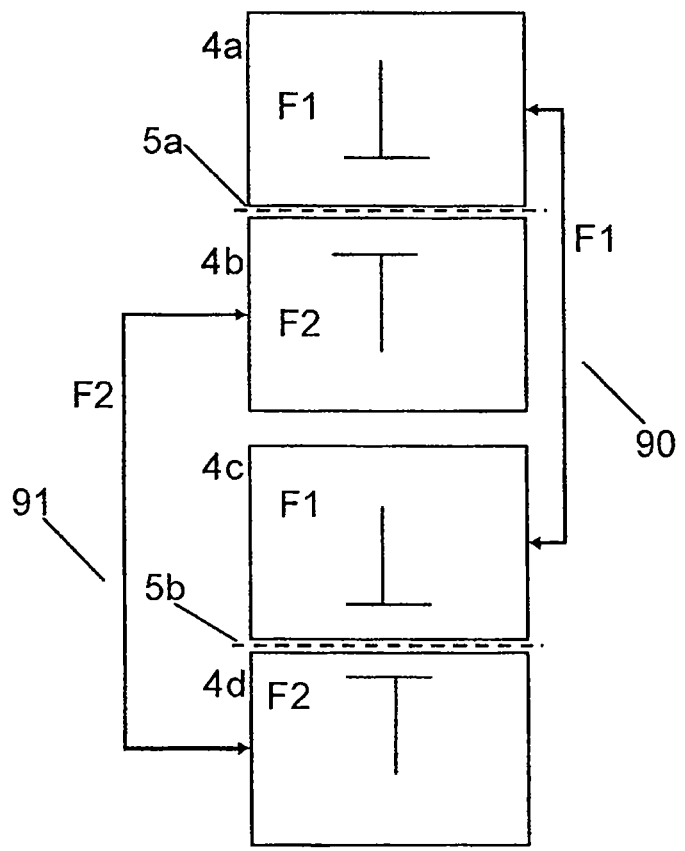

FIG. 10 is similar to FIG. 8, but in FIG. 10 there is provided fluid contact between the two pairs of confinement; 4a and 4c, and 4b and 4d, and therefore FO is performed only between the two fluids F1 and F2. Thus, FIG. 10 also resembles FIG. 9 in that respect. Fluid connection is provided by fluid connection means 90 and 91.

Figure 11:
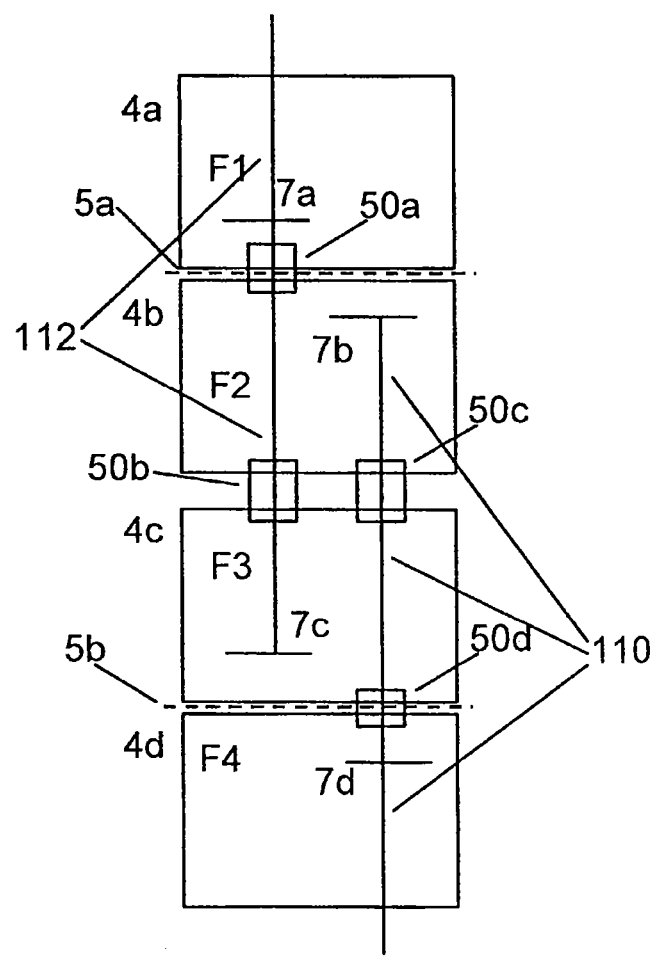

FIG. 11 is also similar to FIG. 8 in the sense that four different fluids F1-F4 are being processed. However, FIG. 11 resembles FIG. 5 where the rotational speed of the first swirl generator 7a is mechanically connected to the rotational speed of the second swirl generator 7b as they share the same axis of rotation. The same concept can be applied in a multi-level configuration where axis 112 connects swirl generator 7a in confinement 4a with swirl generator 7c in confinement 4c. Appropriate sealing 50a and 50c i.e. shaft sealings are provided to prevent leakage between the respective confinements. Similarly, axis 110 connects swirl generator 7b in confinement 4b with swirl generator 7d in confinement 4d. Appropriate sealing 50c and 50d i.e. shaft sealings are provided to prevent leakage between the respective confinements. This may simplify design of the forward osmosis device and lower energy consumption.

Figure 12:
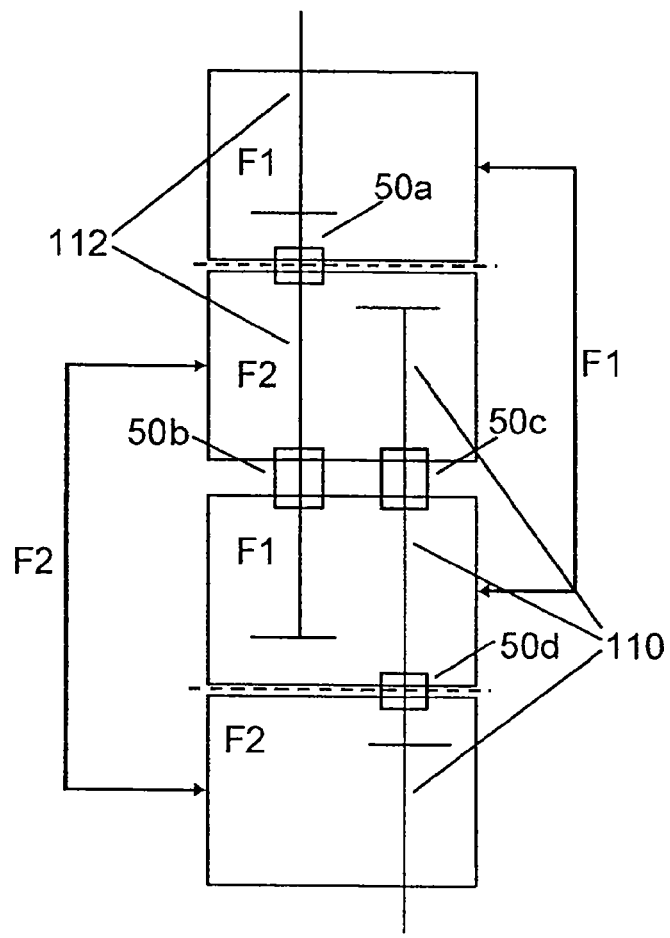

FIG. 12 is similar to FIG. 11 in that two through-going axes 110 and 112 are provided for driving the four swirl generators 7a, 7b, 7c, and 7d. However, FIG. 12 resembles FIGS. 9 and 10 due to the fluid connection between confinements 4a and 4c, and 4b and 4d, respectively. Thus, only two fluids F1 and F2 are being processed in the FO device shown in FIG. 12. Like in FIG. 11, appropriate sealings 50a, 50b, 50c and 50d i.e. shaft sealings are provided. Upon designing a forward osmosis device according to the present invention with the use of shaft sealings, such as 50a, 50b, 50c and 50d, appropriate care should be taken to facilitate service and maintenance. It is known in the art that shaft sealings are typically a vulnerable part of a fluid handling device.

Figure 13:
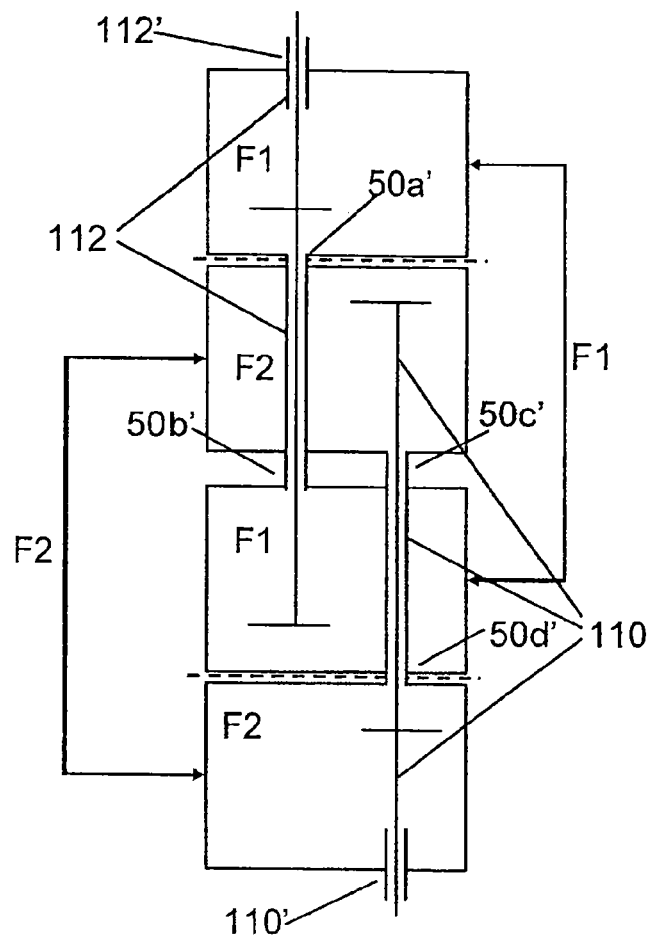

The forward osmosis device shown in FIG. 13 is similar to the device shown in FIG. 12 except that the two through-going axes 110 and 112 are positioned within conduction means 110' and 112' capable of confining and conducting the fluids F1 and F2 to the appropriate swirl generators e.g. pipes. The sealings 50a', 50b', 50c', and 50d' are therefore not shaft sealings but may be sealings for through-going pipes which are simpler and easier to maintain.

Figure 14:
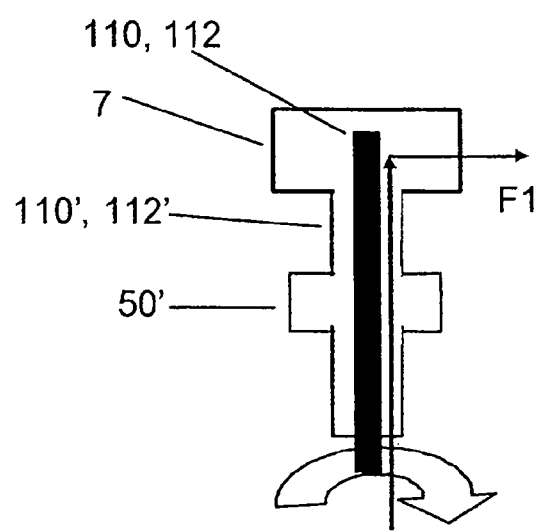
FIG. 14 is a more detailed schematic drawing of the shaft and swirl generator configuration of the device shown in FIG. 13.

FIG. 14 is a more detailed schematic cut-out drawing of the shaft and swirl generator configuration of the device shown in FIG. 13. The axes 110 and 112 are seen to be positioned within the pipes 110' and 112' and the rotating motion of the axes may be transferred to the swirl generator 7. The pipes 110' and 112' and the sealing 50' are proportionated to each other for substantially leak-free sealing.

Figure 15:
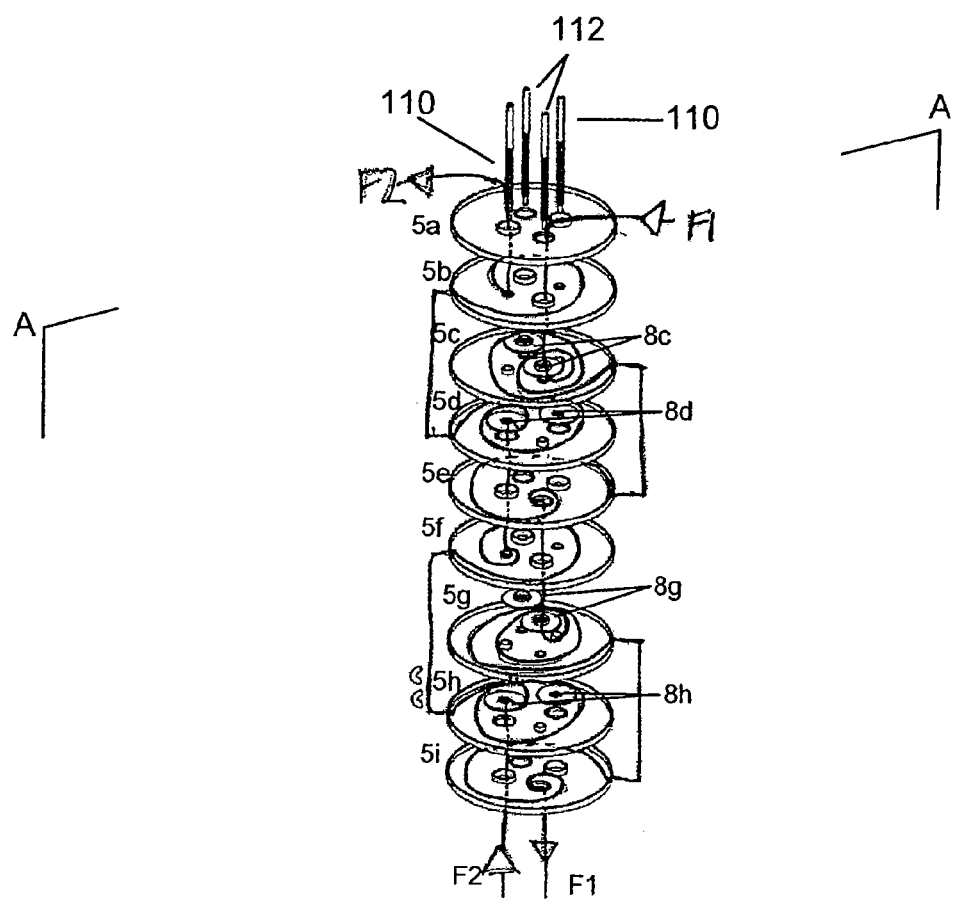
FIG. 15 shows a perspective drawing of a multi-level forward osmosis device with two fluids according to the present invention.

FIG. 15 is a perspective drawing of a forward osmosis device 10 according to the present invention. Two fluids flowing in opposite direction is being processed in the device 10, i.e. fluid F1 is flowing from top to bottom in FIG. 15, whereas fluid F2 is flowing from bottom to top as also indicated by the flow arrows of the fluids. In FIG. 15 only semi-permeable membrane 5a to 5i are shown in a stacked formation similar to multi-level configurations schematically displayed in FIGS. 8-13, thus the confinements and fluids conduction means are not shown in FIG. 15 for reason of simplicity.

Between membranes 5b and 5c an impeller 8c is creating a circular flow pattern for F1 as shown in FIG. 15. Likewise, between membranes 5c and 5d an impeller 8d is creating a circular flow pattern for F2. It should be remembered that impellers can also create circular flow patterns on levels above and below their positions, cf. the discussion in connection with FIG. 9. This is also visible in the flow pattern of F1 between membranes 5d and 5e, and to less extent between membranes 5h and 5i, and for fluid F2 the circular flow pattern is visible between membranes 5a and 5b and also between membranes 5e and 5f.

In the top of FIG. 15, part of rotating axes 110 and 112 is shown. Rotating axes goes through the corresponding holes in the membranes 5a to 5i and drive the corresponding impellers 8c, 8d, 8g, and 8h, similar to the relative positions of impellers shown in FIG. 7, part A. The holes through the membranes 5a to 5i are also applied for fluid connections between the various level as also indicated by the fluids flow marked by the two arrows going through the device 10 in opposite directions. It should be noted that the device of FIG. 15 contains no shaft sealings which may be an advantage for the durability.

Figure 16:
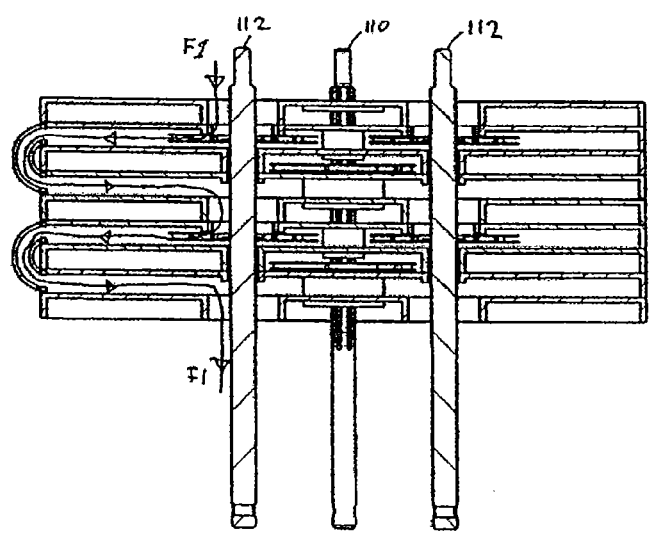
FIG. 16 is a cross-sectional drawing of the device shown in FIG. 15.

FIG. 16 is a cross-sectional drawing of the device shown in FIG. 15 through the section A-A indicated there. A part of the fluid path of F1 is shown by the arrow going through the FO device.

Figure 17:
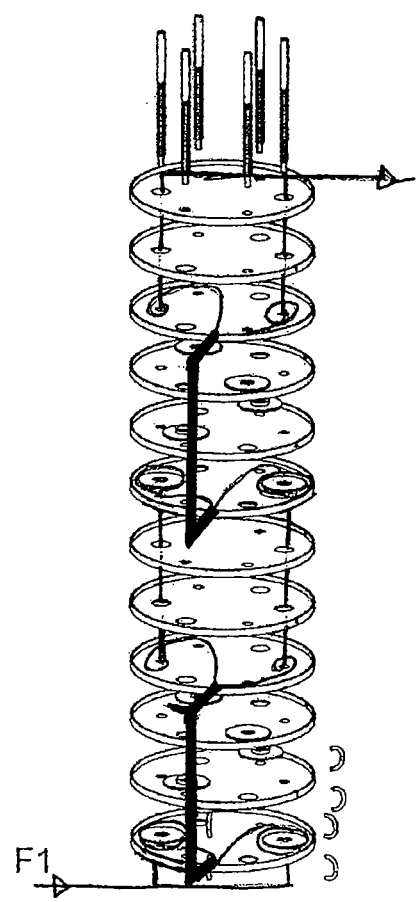
FIG. 17 shows a perspective drawing of a multi-level forward osmosis device with three fluids according to the present invention.

FIG. 17 shows a perspective drawing of a multi-level forward osmosis device with three fluids according to the present invention. The device of FIG. 17 may thus be regarded as an extrapolation of the device shown in FIGS. 15 and 16 in going from two to three fluids. Of course the principle of the present invention may thus be readily extended to more than three fluids. For simplicity only one fluid path F1 through the FO device is shown in FIG. 17.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A forward osmosis (FO) device, the device comprising:
   a semi-permeable membrane capable of performing forward osmosis between a first (F1) and a second fluid (F2),
   a first fluid confinement positioned on a first side of the membrane, the first fluid confinement comprising a first swirl generator through which the first liquid (F1) is conveyable to the first fluid confinement, and
   a second fluid confinement positioned on a second side of the membrane, the second side being opposite to the membrane relative to the said first side, the second fluid confinement comprising a second swirl generator through which the second liquid (F2) is conveyable to the second fluid confinement, wherein the first and second swirl generator, upon engagement, are arranged to create a circular flow pattern (S2, S3) for the first and the second fluid, respectively by rotating motion (RA1, RA2).

2. The device according to claim 1, wherein the first and second swirl generator each has an axis of rotation which is substantially perpendicular to a surface of the semi-permeable membrane.

3. The device according to claim 1, wherein the rotational speed of the first and the second swirl generator are independently controllable.

4. The device according to claim 1, wherein the rotational speed of the first swirl generator is mechanically connected to the rotational speed of the second swirl generator.

5. The device according to claim 1, wherein the device comprises:
 a further semi-permeable membrane capable of performing forward osmosis between a third (F3) and a fourth fluid (F4),
 a third fluid confinement positioned on a first side of the further membrane, the third fluid confinement comprising a third swirl generator through which the third liquid (F3) is conveyable to the third fluid confinement, and
 a fourth fluid confinement positioned on a second side of the further membrane, the second side being opposite to the further membrane relative to the said first side, the fourth fluid confinement comprising a fourth swirl generator through which the fourth liquid (F4) is conveyable to the fourth fluid confinement,
 wherein the third and fourth swirl generator, upon engagement, are arranged to create a circular flow pattern for the third and the fourth fluid, respectively.

6. The device according to claim 5, wherein fluid is conveyable between the first and the third fluid confinement, or wherein fluid is conveyable between the second and the fourth fluid confinement.

7. The device according to claim 5, wherein the rotational speed of the first swirl generator is mechanically connected to the rotational speed of the third swirl generator, or wherein the rotational speed of the second swirl generator is mechanically connected to the rotational speed of the fourth swirl generator.

8. The device according to claim 5, wherein the third and forth swirl generator, upon engagement, are arranged to create a circular flow pattern for the third and the forth fluid, respectively, by rotating motion.

9. The device according to claim 1, wherein the first and the second a swirl generators comprise one or more impellers.

10. The device according to claim 9, wherein the swirl generators comprise a plurality of impellers, the impellers being arranged in a substantially symmetric array.

11. The device according to claim 1, wherein the first or, second membrane is substantially planar.

12. A method for operating a forward osmosis device according to claim 1, wherein the forward osmosis device, at least for some operational parameters, for any of the first (F1), the second (F2), third (F3) or the fourth (F4) fluids has a cross flow velocity over the corresponding membrane which is substantially independent of the corresponding fluid velocity through the corresponding swirl, and wherein the first or the second swirl generator has a design swirl number Sv/w with the ratio of maximum (or average) tangential velocity to a maximum (or average) radial velocity:

$$Sv/w = Vt\,O/Vr\,O,$$

wherein the method comprises operating the forward osmosis device with a design swirl number Sv/w of at least 1, 2, 3, 4, 5, 6, 7, 8, 9, 10, or 15.

13. The method for operating a forward osmosis device according to claim 12, wherein the design swirl number Sv/w is controllable by the rotational speed (RA1, RA2) of the swirl generator and/or by the flow rate of fluid (F1, F2, F3, F4) flowing through the said swirl generator.

14. The method for operating a forward osmosis device according to claim 12, wherein the rotational speed (RA1, RA2) of the first, the second, the third or the fourth swirl generator is controllable in response to a given demand for membrane flux from the FO device.

15. A fluid management system comprising a forward osmosis device according to claim 1.

* * * * *